US012803879B2

(12) United States Patent
Jung et al.

(10) Patent No.: US 12,803,879 B2
(45) Date of Patent: Nov. 17, 2026

(54) METHOD FOR CONTROLLING MESSAGE SENDING AND MESSAGE SERVICE SYSTEM USING THE SAME

(71) Applicant: SAMSUNG SDS CO., LTD., Seoul (KR)

(72) Inventors: Tae Il Jung, Seoul (KR); Kyeong Soo Jeong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 71 days.

(21) Appl. No.: 18/746,368

(22) Filed: Jun. 18, 2024

(65) Prior Publication Data

US 2025/0080429 A1 Mar. 6, 2025

(30) Foreign Application Priority Data

Sep. 4, 2023 (KR) ........................ 10-2023-0116620

(51) Int. Cl.
*H04L 41/147* (2022.01)

(52) U.S. Cl.
CPC .................................. *H04L 41/147* (2013.01)

(58) Field of Classification Search
None
See application file for complete search history.

(56) References Cited

U.S. PATENT DOCUMENTS

2016/0353469 A1* 12/2016 Kim .................... H04W 72/569
2019/0164081 A1* 5/2019 Deluca ..................... G06N 3/02
2020/0136975 A1* 4/2020 Arora .................... H04L 41/147
2021/0211315 A1* 7/2021 Kubba .................. H04L 41/145
2022/0225126 A1* 7/2022 Ma ........................ H04W 24/02
2022/0398133 A1* 12/2022 Gaddam ................ G06N 20/00
2023/0038164 A1 2/2023 Naeini
2025/0117825 A1* 4/2025 Longo .................... G06N 20/00

FOREIGN PATENT DOCUMENTS

| | | | |
|---|---|---|---|
| CN | 101917690 | A | 12/2010 |
| CN | 111245913 | A | 6/2020 |
| JP | 2019-145026 | A | 8/2019 |
| KR | 10-2013-0021183 | A | 3/2013 |
| KR | 10-1386160 | B1 | 4/2014 |
| KR | 10-2017-0078012 | A | 7/2017 |
| KR | 10-1821985 | B1 | 1/2018 |
| WO | WO 2022/032642 | A1 | 2/2022 |
| WO | WO 2023/028116 | A1 | 3/2023 |

OTHER PUBLICATIONS

European Office Action issued on Aug. 27, 2024, in counterpart European Patent Application No. 24181092.8 (4 pages).

* cited by examiner

*Primary Examiner* — June Sison
(74) *Attorney, Agent, or Firm* — NSIP Law

(57) ABSTRACT

There is provided a method for controlling message sending, performed by at least one computing device The method may comprise acquiring sending information of a target message; configuring input data of a machine-learning model based on the sending information, the machine-learning model being trained through a task of predicting a future load of a message sending module; predicting a load of the message sending module according to sending the target message from the input data through the machine-learning model; and controlling the message sending module based on the predicted load.

19 Claims, 13 Drawing Sheets

METHOD FOR CONTROLLING MESSAGE SENDING AND MESSAGE SERVICE SYSTEM USING THE SAME

CROSS-REFERENCE TO RELATED APPLICATION

This application claims priority from Korean Patent Application No. 10-2023-0116620 filed on Sep. 4, 2023, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for effectively controlling the sending of large quantities of messages by considering system load and failure occurrence, and a message service system using the same.

2. Description of the Related Art

Currently, systems for sending large quantities of messages (e.g., text messages, instant messages, emails, etc.) are being built and utilized in various fields. In addition, when building such a message sending system, it is common to build a monitoring system to prevent failure occurrences.

Most existing monitoring systems operate in a method in which a notification is sent to an administrator when an issue (e.g., an occurrence of load exceeding a certain level) occurs in the message sending system. However, in this method, since it is difficult to give the administrator sufficient time to resolve the issue, there may frequently be cases in which a specific issue leads to a serious failure in the message sending system.

SUMMARY

Aspects of the present disclosure provide a method that may effectively control the sending of large quantities of messages by considering system load and failure occurrence, and a system using the same.

Aspects of the present disclosure also provide a method that may accurately predict a future load of a system in advance.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present closure, there is provided a method for controlling message sending, performed by at least one computing device The method may comprise acquiring sending information of a target message; configuring input data of a machine-learning model based on the sending information, the machine-learning model being trained through a task of predicting a future load of a message sending module; predicting a load of the message sending module according to sending the target message from the input data through the machine-learning model; and controlling the message sending module based on the predicted load.

In some embodiments, the configuring of the input data of the machine-learning model may include configuring the input data by reflecting the sending information in processing status information of the message sending module.

In some embodiments, the processing status information may include a cumulative sending amount to date, a remaining sending amount, and a current sending speed.

In some embodiments, the process of training the machine-learning model may include inputting data including a scheduled sending time of a specific message, a load of the message sending module at a specific time, a remaining sending amount at the specific time, and a sending speed at the specific time into the machine-learning model; acquiring future load information output from the machine-learning model, the future load information relating to a load at the scheduled sending time of the specific message; and updating parameters of the machine-learning model based on a difference between the future load information and correct answer load information.

In some embodiments, the predicting of the load of the message sending module according to the sending of the target may include predicting the load of the message sending module in response to a sending schedule of the target message being registered.

In some embodiments, the input data may include information regarding a scheduled sending time of the target message, and the predicting of the load of the message sending module according to the sending of the target may include predicting the load of the message sending module at the scheduled sending time.

In some embodiments, the controlling of the message sending module may include determining a maximum adjustment range for a sending speed of the message sending module based on the predicted load; and gradually increasing or decreasing the sending speed of the message sending module so that the sending speed of the message sending module is adjusted to the maximum adjustment range at the scheduled sending time.

In some embodiments, the controlling of the message sending module may include decreasing a sending speed of the message sending module based on a determination that the predicted load is greater than or equal to a reference value.

In some embodiments, the sending information may include information about a sending schedule of the target message, and the controlling of the message sending module may include adjusting the sending schedule of the target message based on a determination that the predicted load is greater than or equal to a reference value.

In some embodiments, the method may further comprise sending a monitoring request notification to a terminal of an administrator of the message sending module based on the determination that the predicted load is greater than or equal to a reference value, wherein the monitoring request notification is configured to provide the administrator with a management interface having a sending speed control function of the message sending module.

In some embodiments, the method may further comprise sending a monitoring request notification to a terminal of an administrator of the message sending module based on the determination that the predicted load is greater than or equal to a reference value, wherein the monitoring request notification is configured to provide the administrator with sending schedule information for pre-registered messages.

In some embodiments, the method may further comprise acquiring a new machine-learning model; and controlling sending of a message different from the target message using the new machine-learning model, wherein the new machine-learning model is trained using processing status information including load information of the message sending module and message sending history collected after training of the machine-learning model is completed.

According to another aspect of the present closure, there is provided a message service system. The message service system may comprise one or more processors; and a memory that stores a computer program executed by the one or more processors, wherein the computer program includes instructions that perform operations of: acquiring sending information for a target message; configuring input data of a machine-learning model based on the sending information, the machine-learning model being trained through a task of predicting a future load of a message sending module; predicting a load of the message sending module according to sending the target message from the input data through the machine-learning model; and controlling the message sending module based on the predicted load.

In some embodiments, the operation of configuring the input data of the machine-learning model may include an operation of configuring the input data by reflecting the sending information in processing status information of the message sending module.

In some embodiments, the operation of predicting the load of the message sending module according to the sending of the target may include an operation of predicting the load of the message sending module in response to a sending schedule of the target message being registered.

In some embodiments, the input data may include information regarding a scheduled sending time of the target message, and the operation of predicting the load of the message sending module according to the sending of the target may include an operation of predicting the load of the message sending module at the scheduled sending time.

In some embodiments, the computer program may further include an instruction that performs an operation of sending a monitoring request notification to a terminal of an administrator of the message sending module based on the determination that the predicted load is greater than or equal to a reference value, the monitoring request notification is configured to provide the administrator with a management interface having a sending speed control function of the message sending module.

In some embodiments, the computer program may further include an instruction that performs an operation of sending a monitoring request notification to a terminal of an administrator of the message sending module based on the determination that the predicted load is greater than or equal to a reference value, the monitoring request notification is configured to provide the administrator with sending schedule information for pre-registered messages.

In some embodiments, the computer program may further include instructions that perform: an operation of acquiring a new machine-learning model; and an operation of controlling sending of a message different from the target message using the new machine-learning model, and the new machine-learning model is trained using processing status information including load information of the message sending module and message sending history collected after training of the machine-learning model is completed.

According to still another aspect of the present closure, there is provided a computer program coupled to a computing device and stored in a computer-readable record medium to execute: acquiring sending information for a target message; configuring input data of a machine-learning model based on the sending information, the machine-learning model being trained through a task of predicting a future load of a message sending module; predicting a load of the message sending module according to sending the target message from the input data through the machine-learning model; and controlling the message sending module based on the predicted load.

According to some exemplary embodiments of the present disclosure, the future load of the message sending module (e.g., the load at the scheduled sending time of the target message) may be predicted through a machine-learning model. In addition, the sending speed of the message sending module may be controlled in advance based on the predicted load. Accordingly, the failure occurrence of the message sending module (or message service system) may be effectively prevented.

In addition, a monitoring request notification may be sent to a terminal of an administrator based on the predicted load. That is, the monitoring request notification may be sent to the terminal of the administrator before a serious load (or issue/failure) occurs. In this case, since the administrator may be given sufficient time to resolve the issue (or take preemptive measures), the failure occurrence of the message sending module (or message service system) may be more effectively prevented.

In addition, as the monitoring request notification is configured to provide the administrator with a management interface of the message sending module, convenience for administrator may be improved and it may be possible to immediately respond to the load (or issues/failure) occurrence.

Effects according to the technical idea of the present disclosure are not limited to the effects mentioned above, and other effects that are not mentioned may be obviously understood by those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
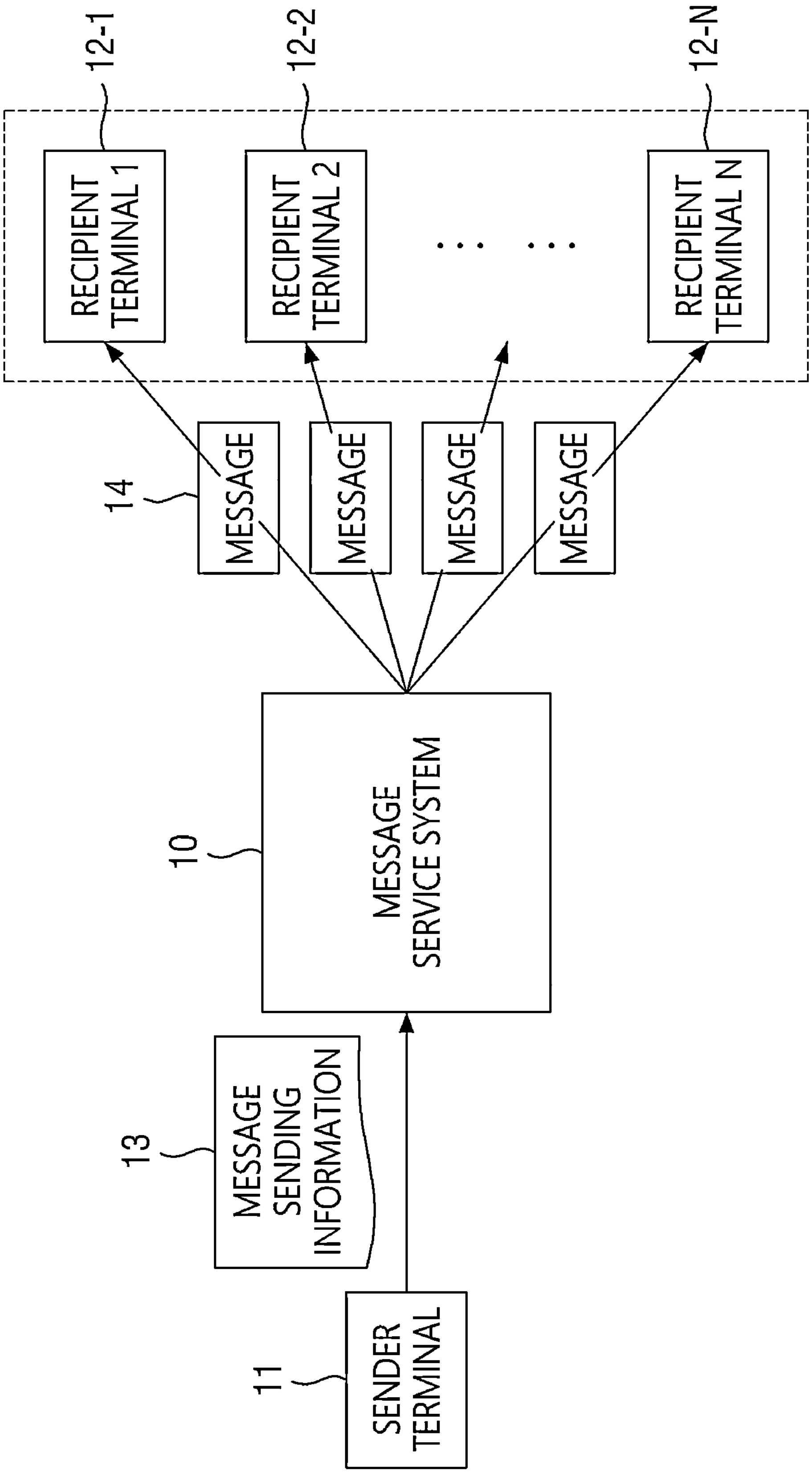
FIGS. 1 and 2 are exemplary diagrams for schematically describing a message service system according to some exemplary embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is an exemplary diagram for schematically describing a message service system 10 according to some exemplary embodiments of the present disclosure. For convenience, FIG. 1 illustrates as if there is only one terminal 11 (i.e., a sender terminal) requesting sending of a message (e.g., 14).

As illustrated in FIG. 1, the message service system 10 according to exemplary embodiments is a computing device/system that provides message services to users. For example, the message service system 10 may receive message sending information 13 (e.g., information about sending schedule, recipient, etc.) from the sender terminal 11, and may send the messages (e.g., 14) to a plurality of recipient terminals 12-1 to 12-N based on the message sending information 13. As such, the message service system 10 may be a system that provides a service for sending the messages (e.g., 14) in bulk, but the scope of the present disclosure is not limited thereto.

Hereinafter, for convenience of explanation, the message service system 10 will be abbreviated as "message system 10". In addition, when referring to any recipient terminal 12-1 or 12-2, . . . or 12-N or to collectively referring to all recipient terminals 12-1 to 12-N, the reference number "12" is used.

Figure 2:
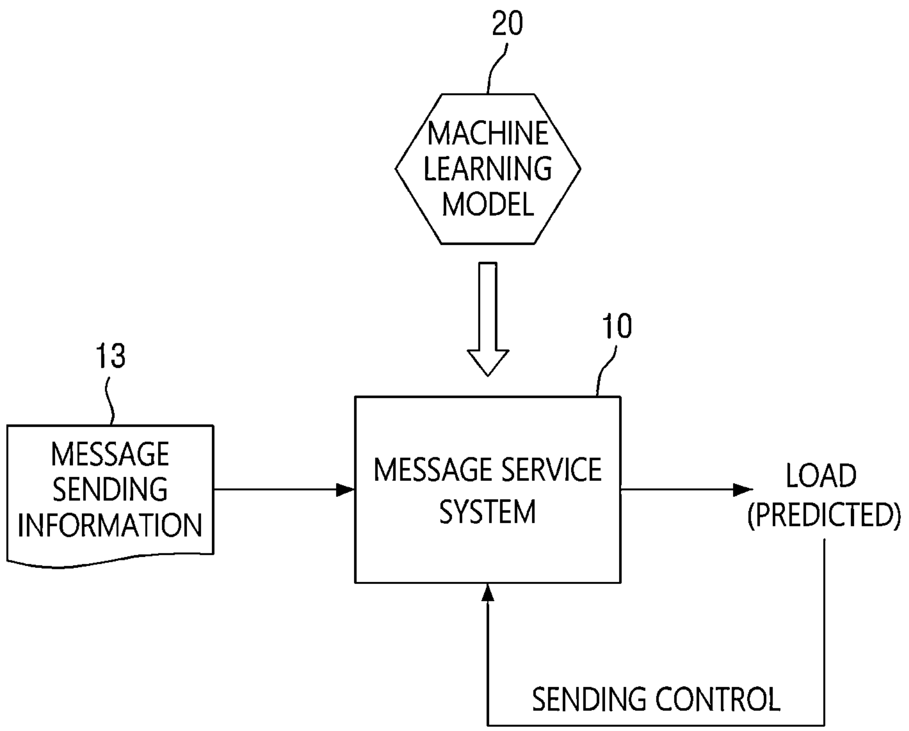

In various exemplary embodiments of the present disclosure, the message system 10 may predict in advance a load (i.e., future load) expected from message sending and control the message sending based on the predicted load. Specifically, as illustrated in FIG. 2, the message system 10 may predict a load expected from message sending information 13 through a machine-learning model 20. For example, the message system 10 may predict a load at the scheduled sending time of the message. In addition, the message system 10 may control the message sending in various methods based on the predicted load. In this way, a failure occurrence of the message system 10 may be effectively prevented.

The detailed configuration and operation of the message system 10, input data of the machine-learning model 20, etc. will be described in detail with reference to the drawings below FIG. 3.

The message system 10 described above may be implemented with at least one computing device. For example, all functions of the message system 10 may also be implemented in one computing device, a first function of the message system 10 may also be implemented in a first computing device, and a second function thereof may also be implemented in a second computing device. Alternatively, a specific function of the message system 10 may also be implemented in a plurality of computing devices.

The computing device may include any device having a computing function, and an example of such a device will be described with reference to FIG. 13. Since the computing device is an aggregate in which various components (e.g., memory, processor, etc.) interact, the computing device may be referred to as a "computing system" in some cases. In addition, the term computing system may also include the concept of an aggregate in which a plurality of computing devices interact.

The sender terminal 11 and the recipient terminal 12 are terminals of users (i.e., sender and recipient) who use the message service, respectively. Such terminals 11 and 12 may be implemented with any computing device. For example, the terminals 11 and 12 may be implemented with a stationary computing device or a mobile computing device. An example of the computing device will be described with reference to FIG. 13.

The message system 10 and the terminals 11 and 12 may communicate over a network. Here, the network may be implemented as all types of wired/wireless networks such as a Local Area Network (LAN), a Wide Area Network (WAN), a mobile radio communication network, and Wireless Broadband Internet (Wibro).

Hereinabove, the message system 10 according to some exemplary embodiments of the present disclosure has been schematically described with reference to FIGS. 1 and 2.

Hereinafter, the detailed configuration and operation of the message system 10 will be described with reference to FIG. 3.

Figure 3:
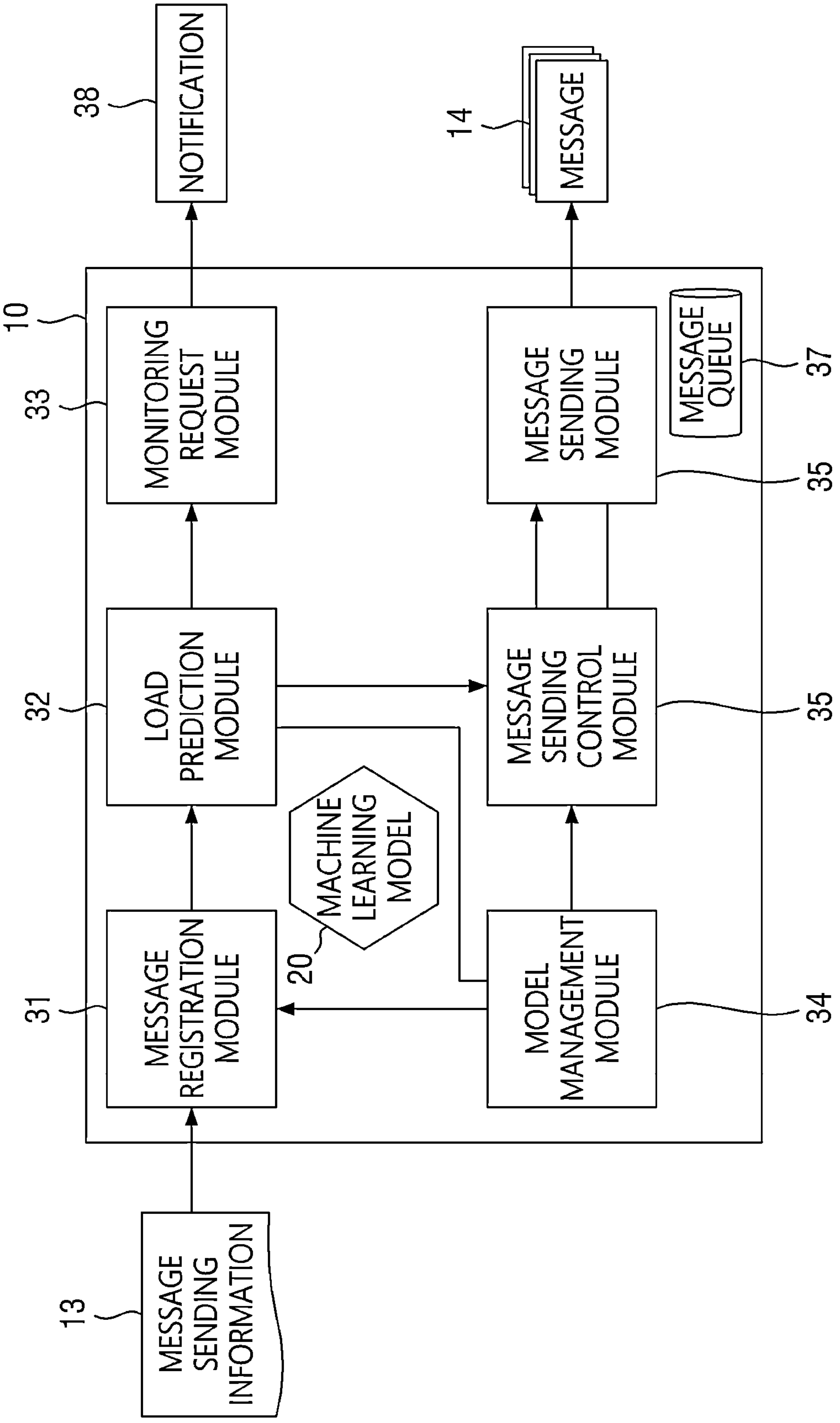
FIG. 3 is an exemplary block diagram illustrating the message service system according to some exemplary embodiments of the present disclosure.

FIG. 3 is an exemplary block diagram illustrating the message service system 10 according to some exemplary embodiments of the present disclosure. Arrows illustrated in FIG. 3 represent exemplary data flows. However, the scope of the present disclosure is not limited thereto. In some cases, the data flow within the message system 10 may differ from that illustrated.

As illustrated in FIG. 3, the message system 10 may be configured to include a message registration module 31, a load prediction module 32, a monitoring request module 33, a model management module 34, a message sending control module 35, and a message sending module 36. However, only the components related to the exemplary embodiments of the present disclosure are illustrated in FIG. 3. Therefore, those skilled in the art to which the present disclosure belongs may know that other general-purpose components (e.g., a database, etc.) may be further included in addition to the components illustrated in FIG. 3. In addition, the components 31 to 36 of the message system 10 illustrated in FIG. 3 represent functional elements that are functionally separated, and may be implemented in the from in which a plurality of components may be integrated with each other in an actual physical environment, and may be implemented in the form in which a specific component is separated into a plurality of sub-components. Hereinafter, each of the components 31 to 36 of the message system 10 will be described.

The message registration module 31 is a module responsible for an overall function of message registration. For example, the message registration module 31 may register a message sending schedule according to a request from the sender terminal 11. Sending schedule information may be included in the sending information 13 of the corresponding message. The message registration module 31 may provide the sender with an interface for registering the sending schedule or inputting the sending information 13.

The message may be, for example, a message sent to a plurality of recipients. Examples of such a message may include a notification message (e.g., a message related to announcement, event, etc.), a survey message, etc., but the scope of the present disclosure is not limited thereto. The form/type of the message may vary, for example, text message, instant message, email, etc.

The sending information 13 of the message may include various types of information related to the message sending without limitation. For example, the sending information 13 may include information such as message type, message content, recipient information (e.g., recipient ID, number of recipients, etc.), sending schedule (e.g., scheduled sending time, scheduled sending end time, sending cycle, etc.); size of message, repeated sending method (e.g., whether to send repeatedly, repetition cycle, etc.), reminder method (e.g., whether to send a reminder message, when to send a reminder message, sending interval of a reminder message, whether to send repeatedly, etc.), and importance, but the scope of the present disclosure is not limited thereto. At least some of the detailed items of the sending information 13 may vary depending on the type of message (e.g., notification message, survey message, etc.). In the following description, the term "scheduled sending time" may be abbreviated as "sending time."

In some cases, the sending information 13 may be named as "metadata" of the message.

Table 1 below illustrates sending information of the notification message and the survey message, respectively.

TABLE 1

| Classification | Sending Information |
|---|---|
| Notification Message | Data Type (e.g., Text, Image, Web Link, etc.), Number of Recipients, Scheduled Sending Time, Repeat Sending Method, Message Size, etc. |
| Survey Message | Survey Template, Number of Recipients, Survey Period (e.g., Scheduled Start Time, Scheduled End Time), Message Size, Reminder Method |

Next, the load prediction module 32 is a module responsible for an overall function of predicting a load (i.e., future load) of the message sending module 36. Here, the load of the message sending module 36 may also refer to the load of the message system 10. The load may be, for example, a usage rate of resources such as a processor, a memory, etc., but the scope of the present disclosure is not limited thereto.

The load prediction module 32 may periodically or aperiodically predict the load of the message sending module 36. For example, the load prediction module 32 may predict the load of the message sending module 36 according to a request from the message registration module 31 and/or the message sending control module 35. The message registration module 31 may request a load prediction whenever a message sending schedule is registered, but the scope of the present disclosure is not limited thereto. As another example, the load prediction module 32 may also predict the load of the message sending module 36 according to a preset cycle. In this case, the cycle may be a fixed value or a value that changes depending on the situation. For example, as a current load (or current sending speed) of the message sending module 36 is higher, the cycle may be changed to a smaller value, and in the opposite case, the cycle may be changed to a larger value. Alternatively, as a remaining sending amount increases, the cycle may be changed to a smaller value, and in the opposite case, the cycle may be changed to a larger value.

As illustrated, the load prediction module 32 may predict the load (i.e., future load) of the message sending module 36 through the machine-learning model 20. For example, the load prediction module 32 may configure input data based on the sending information 13 of the message and may predict the load (e.g., the load at the scheduled sending time of the corresponding message) of the message sending module 36 according to the sending (i.e., scheduled sending) of the corresponding message through the machine-learning model 20. The load prediction module 32 may receive the machine-learning model 20 from the model management module 34.

As a more specific example, the load prediction module 32 may configure the input data by reflecting the message sending information 13 in processing status information of the message sending module 36. Here, the processing status information may include, for example, a cumulative sending amount to date, a remaining sending amount, a current load of the message sending module 36, a sending speed, a recipient's response amount (i.e., the number of response messages), etc., but scope of the present disclosure is not limited thereto.

Examples of the input data refer to Table 2 below.

TABLE 2

| Item | Example |
|---|---|
| Load | 70% |
| Cumulative Sending Amount | 15,000 Cases |
| Remaining Sending Amount | 20,000 Cases |
| Scheduled Sending Time | 2023 Apr. 2019 14:00:00 |
| Scheduled Sending End Time | 2023 Apr. 2019 14:40:00 |
| Response Amount | 500 Cases |
| Current Sending Speed | 70 Cases/Second |
| Message Size | 100 kb |

Next, the monitoring request module 33 is a module responsible for an overall function of a monitoring request. For example, the monitoring request module 33 may send a monitoring request notification 38 to the administrator based on the determination that the load predicted by the load prediction module 32 is greater than or equal to a reference value. This further refers to the description of FIG. 8.

Next, the model management module 34 is a module responsible for an overall management function for the machine-learning model 20 used for load prediction. For example, the model management module 34 may train and build the machine-learning model 20 by performing a future load prediction task using processing status information and message sending history collected from the message sending module 36. Such a training process refers to the description of FIGS. 9 and 10.

Figure 4:
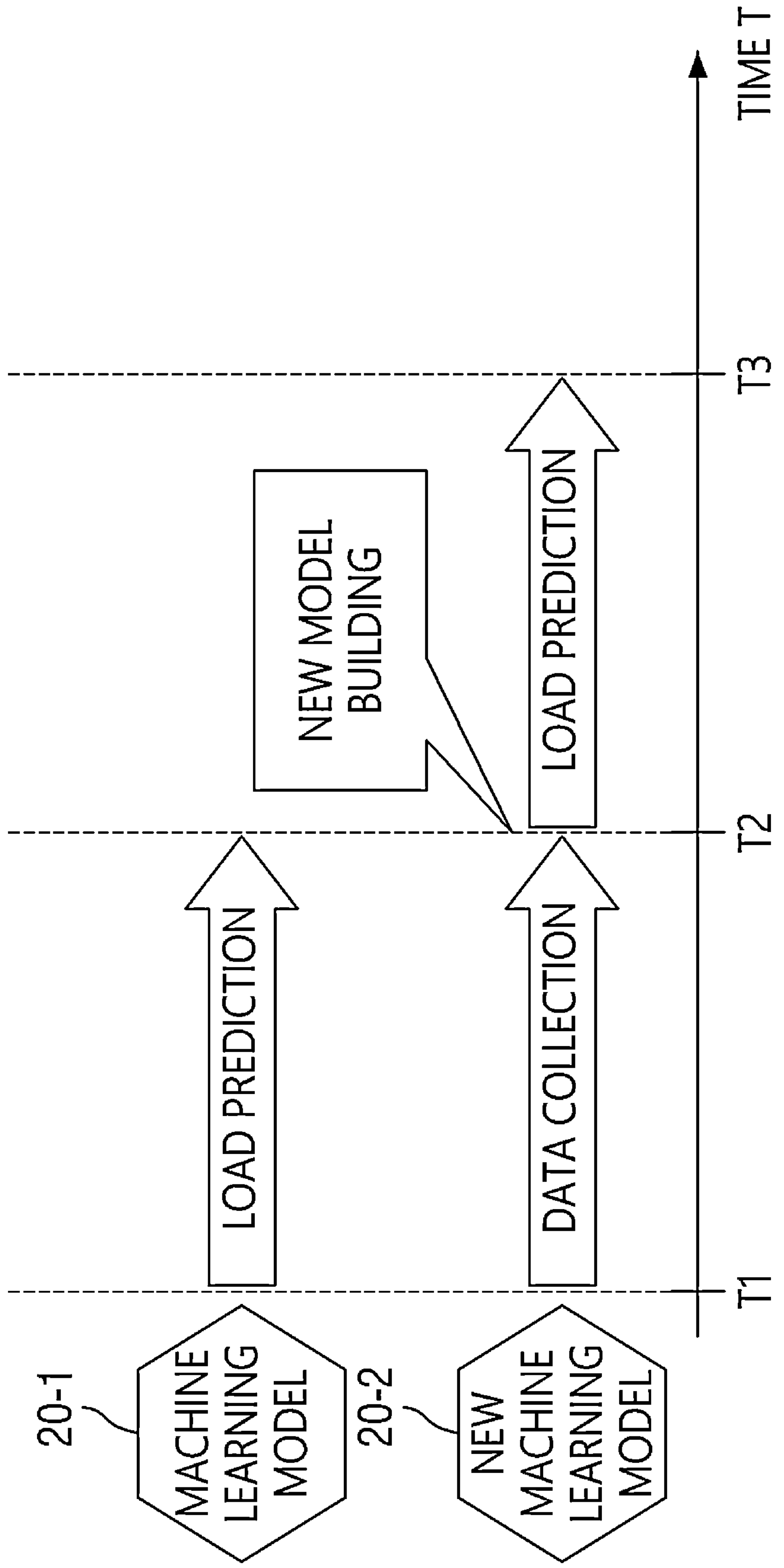
FIG. 4 is an exemplary diagram for describing an operation method of a model management module according to some exemplary embodiments of the present disclosure.

In some exemplary embodiments, as illustrated in FIG. 4, the model management module 34 may periodically or aperiodically build a new machine-learning model 20-2 and provide the new machine-learning model 20-2 to the load prediction module 32. For example, the model management module 34 may build the new machine-learning model 20-2 when a preset time has elapsed, when the amount of collected data (e.g., processing status information, message sending history) is greater than or equal to a reference value, or when it is determined that replacement of the existing machine-learning model 20-1 is necessary (e.g., when a load greater than or equal to the reference value continues to occur or a failure occurs, etc.). However, the scope of the present disclosure is not limited thereto. The model management module 34 may also build (train) the new machine-learning model 20-2 using only data (e.g., processing status information, message sending history) collected after the training of the existing machine-learning model 20-1 is completed and may also build (train) the new machine-learning model 20-2 using a training set of the existing machine-learning model 20-1.

For reference, when the new machine-learning model 20-2 is provided, the load prediction module 32 may predict the load by using the new machine-learning model 20-2 instead of the existing machine-learning model 20-1 and may predict the load by using the two models 20-1 and 20-2 together.

Next, the message sending control module 35 is a module responsible for an overall control function for the message sending module 36. For example, the message sending control module 35 may control a sending speed of the message sending module 36 based on the predicted load. This further refers to the description of FIGS. 5 to 12.

Next, the message sending module 36 may be responsible for an overall function for message sending. For example, the message sending module 36 may insert a message (e.g., a message with a registered sending schedule) into a message queue 37, and may take out the message (e.g., 14) from the message queue 37 and send the message 14 to the recipients' terminals 12 according to the registered sending schedule (e.g., when the scheduled sending time is reached, the message is taken out of the message queue 37 and sent to the recipients).

In some cases, the message sending module 36 may be named as "message sending engine", "message sending unit", "message sending machine", "message sending server/device/system", etc. Other modules 31 to 35 may also be named in a similar manner.

The detailed operations of the message system 10 and the modules 31 to 36 constituting the message system 10 refer to the description of the drawings below in FIG. 5.

Each of the modules 31 to 36 illustrated in FIG. 3 may be implemented through software or hardware such as a field programmable gate array (FPGA) or application-specific integrated circuit (ASIC) and may be executed by one or more processors or one or more computing devices/systems.

For reference, the modules (e.g., at least some of 31 to 36) related to the message sending control function may constitute a "message sending control server/device/system". For example, assuming that the message system 10 is functionally divided into a message sending device/server/system and a message sending control device/server/system, the message registration module 31, the message sending module 36, etc. may configure the message sending device/server/system, and the load prediction module 32, the monitoring request module 33, the model management module 34, the message sending control module 35, etc. may configure the message sending control device/server/system.

Hereinabove, the configuration and operation of the message system 10 according to some exemplary embodiments of the present disclosure have been described with reference to FIGS. 3 and 4. Hereinafter, various methods that may be performed in the above-described message system 10 will be described in detail with reference to the drawings below FIG. 5.

Hereinafter, in order to provide convenience of understanding, the description will be continued on the assumption that all steps/operations of the methods to be described later are performed in the above-described message system 10. Therefore, when a subject of a specific step/operation is omitted, it may be understood that the specific step/operation is performed in the message system 10. However, in a real environment, some steps/operations of the method to be described later may also be performed in other computing devices.

Figure 5:
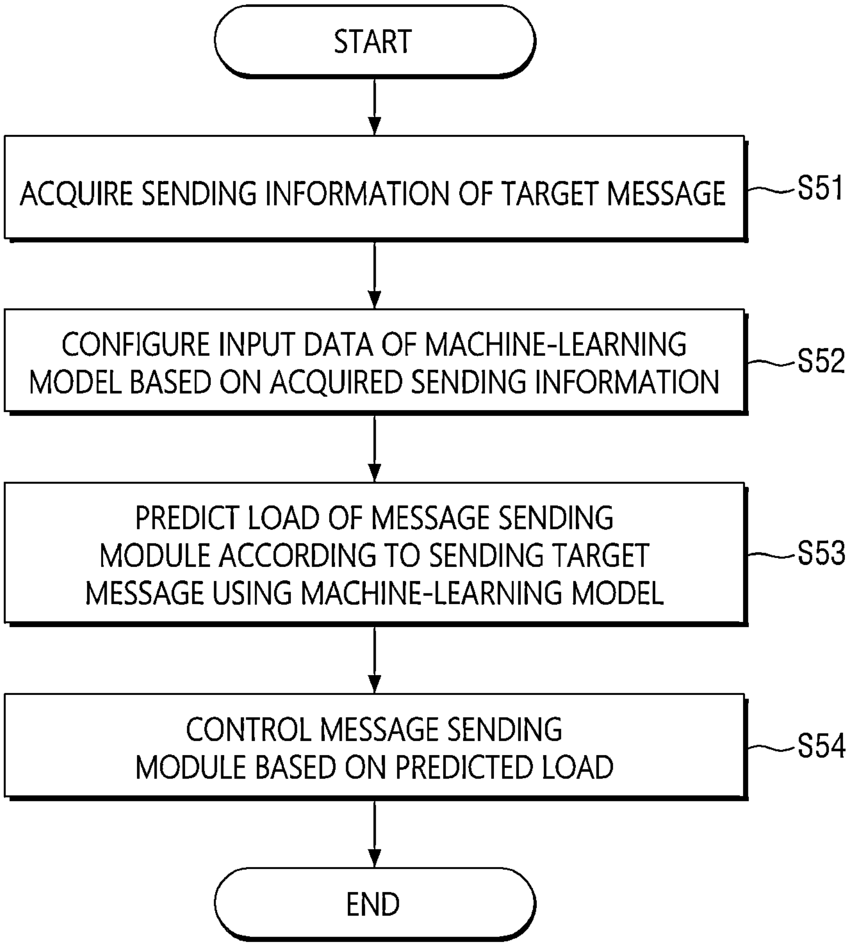
FIG. 5 is an exemplary flowchart illustrating a method for controlling a message sensing according to some exemplary embodiments of the present disclosure.

FIG. 5 is an exemplary flowchart schematically illustrating a method for controlling a message sensing according to some exemplary embodiments of the present disclosure. However, this is only a preferred exemplary embodiment for achieving the object of the present disclosure, and some steps may also be added or deleted as needed.

As illustrated in FIG. 5, a method for controlling a message sensing according to exemplary embodiments may begin at step S51 of acquiring sending information of a target message. Here, the target message may refer to, for example, any message registered in the message system 10 according to the request of the sender terminal 11 (e.g., a message with a registered sending schedule). In addition, as described above, the sending information may include information such as message type, content, recipient information, sending schedule, message size, repetitive sending method, and reminder method. However, the scope of the present disclosure is not limited thereto.

In step S52, input data of the machine-learning model 20 (i.e., trained machine-learning model) may be configured based on the acquired sending information. For example, the message system 10 may configure the input data by reflecting the sending information of the target message in the processing status information of the message sending module 36. As described above, the processing status information of the message sending module 36 may include, for example, the cumulative sending amount to date, the remaining sending amount (e.g., remaining sending amount considering the sending information of the target message), the current sending speed, the current load, etc. However, the scope of the present disclosure is not limited thereto. A more specific example of the input data refers to Table 2 above, and the method of building the machine-learning model 20 (i.e., learning process) will be described later with reference to FIGS. 9 and 10.

Figure 6:
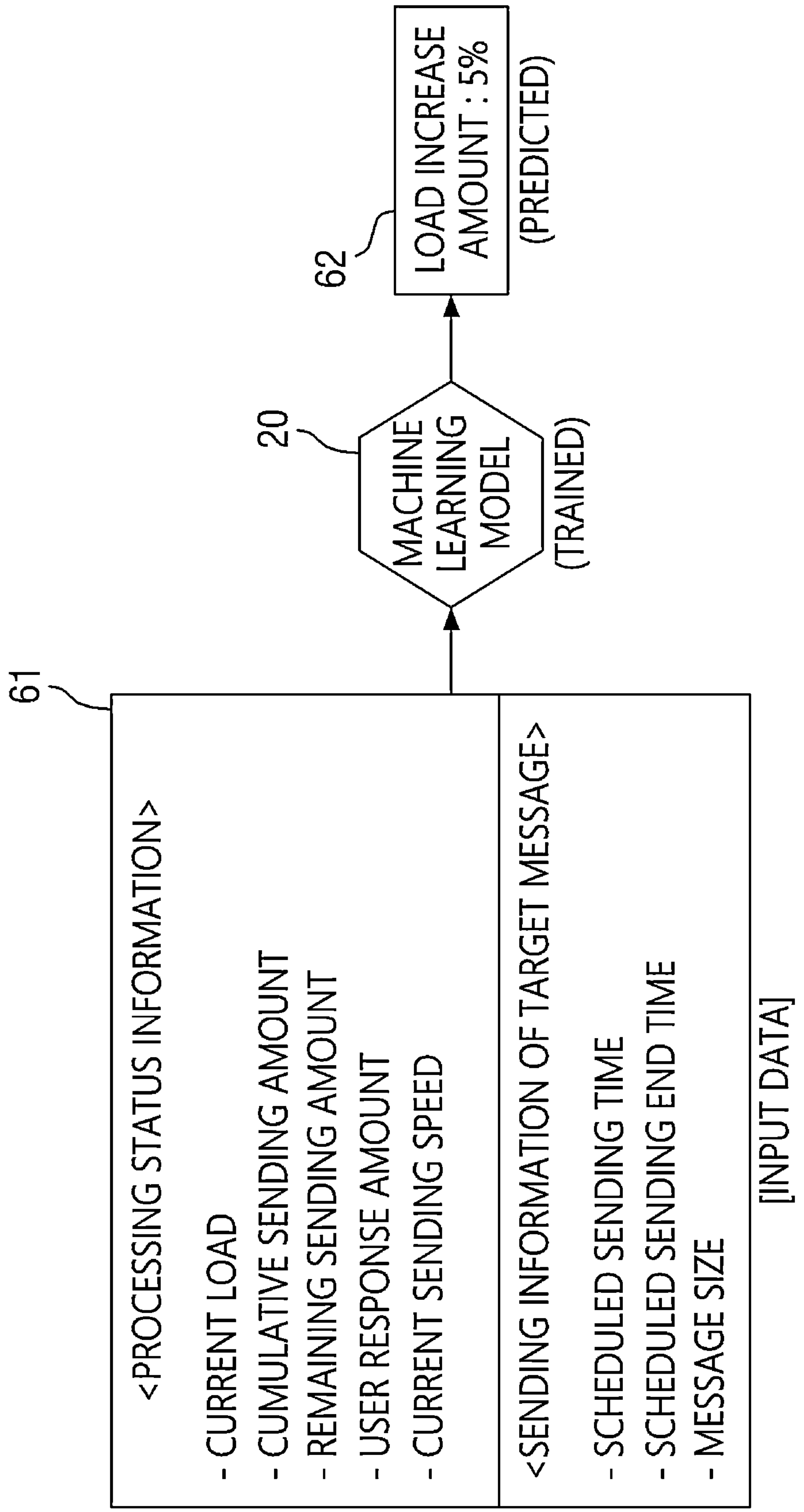
FIG. 6 is an exemplary diagram for further describing a load prediction step illustrated in FIG. 5.

In step S53, a load of the message sending module 36 according to sending the target message may be predicted using the machine-learning model 20. For example, as illustrated in FIG. 6, the message system 10 may predict a load 62 (e.g., amount of increased load, etc.) at a scheduled sending time of the target message by inputting input data 61 into the machine-learning model 20. When the machine-learning model 20 is trained to predict a load (i.e., future load) of the message sending module 36 at a specific time, and the input data includes information on the scheduled sending time of the target message, the load of the message sending module 36 at the scheduled sending time may be accurately predicted through the machine-learning model 20. As described above, the load may refer to the usage rate of resources such as the process, the memory, etc. However, the scope of the present disclosure is not limited thereto.

In this step S53, the message system 10 may predict the load of the message sending module 36 in response to the sending schedule of the target message being registered (e.g., in response to the request from the message registration module 31), but the scope of the present disclosure is not limited thereto. In some cases, the message system 10 may also predict the load of the message sending module 36 periodically or as conditions other than the sending schedule registration are satisfied. For example, whenever the message sending is completed, the message system 10 may also predict the load of the message sending module 36 (e.g., a load of a scheduled sending time of a next sending message) based on the next sending message. That is, the message system 10 may also determine, as the target message, a message whose scheduled sending time is closest (i.e., a message whose scheduled sending time is closest to the current time) among the previously registered messages.

In step S54, the message sending module 36 may be controlled based on the predicted load. Here, controlling the message sending module 36 may mean performing overall control over the message sending.

Meanwhile, the specific method for controlling the message sending module 36 may vary depending on the exemplary embodiment.

Figure 7:
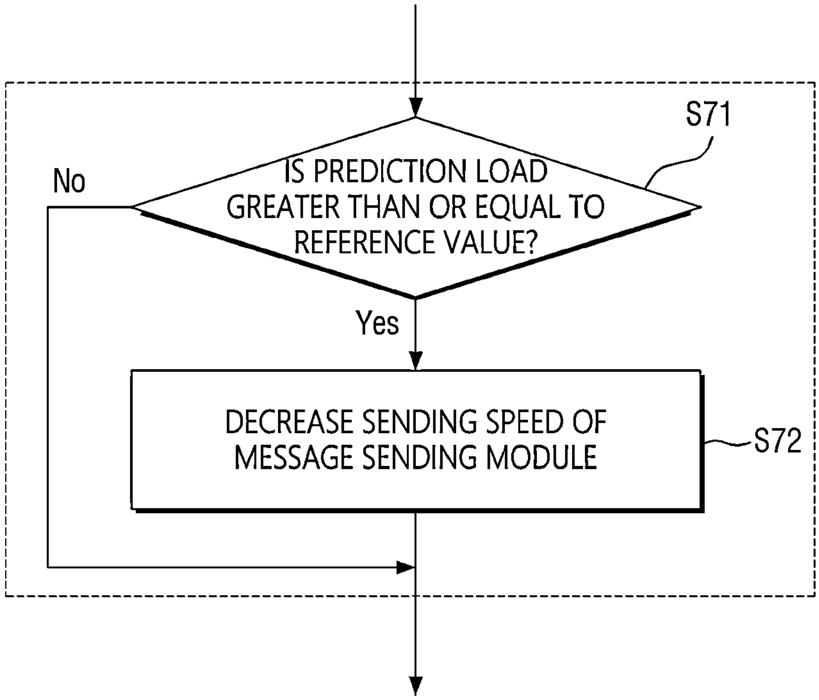
FIG. 7 is an exemplary flowchart for describing a method for controlling a message sensing module according to some exemplary embodiments of the present disclosure.

In some exemplary embodiments, as illustrated in FIG. 7, the message system 10 may reduce a sending speed of the message sending module 36 based on the determination that a predicted load is greater than or equal to a reference value (hereinafter, referred to as a "first reference value") (S61, S62). This may be understood as lowering the load by reducing the sending speed in advance because the load is predicted to increase in the future. In the opposite case, the message system 10 may maintain or increase the sending speed of the message sending module 36. As a specific example, the message system 10 may determine a maximum adjustment range (e.g., reduction range) for the sending speed of the message sending module 36 based on the predicted load (or a difference between the predicted load and the first reference value). In addition, the message system 10 may gradually increase or decrease the sending speed of the message sending module 36 so that the sending speed of the message sending module 36 is adjusted (e.g., reduced) to the maximum adjustment range at a scheduled sending time of the target message.

For reference, since the sending speed means a sending amount per hour (e.g., sending amount per second), reducing the sending speed may be understood as reducing the sending amount.

In some other exemplary embodiments, the message system 10 may adjust (e.g., delay) a sending schedule (e.g., scheduled sending time) of the target message or other messages. For example, the message system 10 may delay the scheduled sending time of the target message. In this case, the degree of delay may also be determined based on the importance of the target message, the predicted load (or the difference between the predicted load and the first reference value), etc. In some cases, the message system 10 may also determine a message for which the sending schedule is to be adjusted among pre-registered messages based on the importance.

In some still other exemplary embodiments, the message system 10 may stop sending the target message or other messages based on a determination that the predicted load is greater than or equal to the first reference value (or a value greater than the first reference value). In some cases, the message system 10 may determine which messages and numbers of messages to stop sending based on the importance, the predicted load (or the difference between the predicted load and the first baseline), etc. (e.g., the higher the predicted load, the more messages are stopped from being sent).

In some other exemplary embodiments, the message system 10 may reduce a size of the target message or other messages based on the determination that the predicted load is greater than or equal to the first reference value. For example, the message system 10 may reduce the size of the message by compressing, summarizing (e.g., in the case of text messages), reducing resolution (downscaling) (e.g., in the case of image messages), etc. However, the scope of the present disclosure is not limited thereto.

In some still other exemplary embodiments, the message system 10 may reduce the number of recipients of the target message or other messages based on the determination that the predicted load is greater than or equal to the first reference value. For example, the message system 10 may designate some of multiple recipients as representative recipients using recipient's affiliation information (e.g., department, rank, etc.) and send the message only to the representative recipients.

In some still other exemplary embodiments, the message sending module 36 may also be controlled based on various combinations of the above-described exemplary embodiments. For example, the message system 10 may reduce the sending speed of the message sending module 36 and at the same time, delay the sending schedule of the target message.

In the above-described exemplary embodiments, the first reference value may be a preset fixed value or a value that changes depending on the situation. For example, the first reference value may be increased or decreased based on a current load of the message sending module 36 (e.g., the higher the current load, the smaller the first reference value is determined). As another example, the first reference value may be set to a minimum value when a failure occurs in the message system 10 and may also be set to gradually increase over time.

For reference, steps S51 to S53 described above may be performed, for example, by the load prediction module 32, and step S54 may be performed, for example, by the message sending control module 35.

Meanwhile, in some exemplary embodiments, a monitoring request notification may be sent to a terminal of an administrator based on the predicted load of the message sending module 36. For example, the message system 10 may send the monitoring request notification to the terminal of the administrator based on a determination that the predicted load is greater than or equal to a reference value (hereinafter, referred to as a "second reference value"). Hereinafter, the present exemplary embodiment will be further described with reference to FIG. 8.

Figure 8:
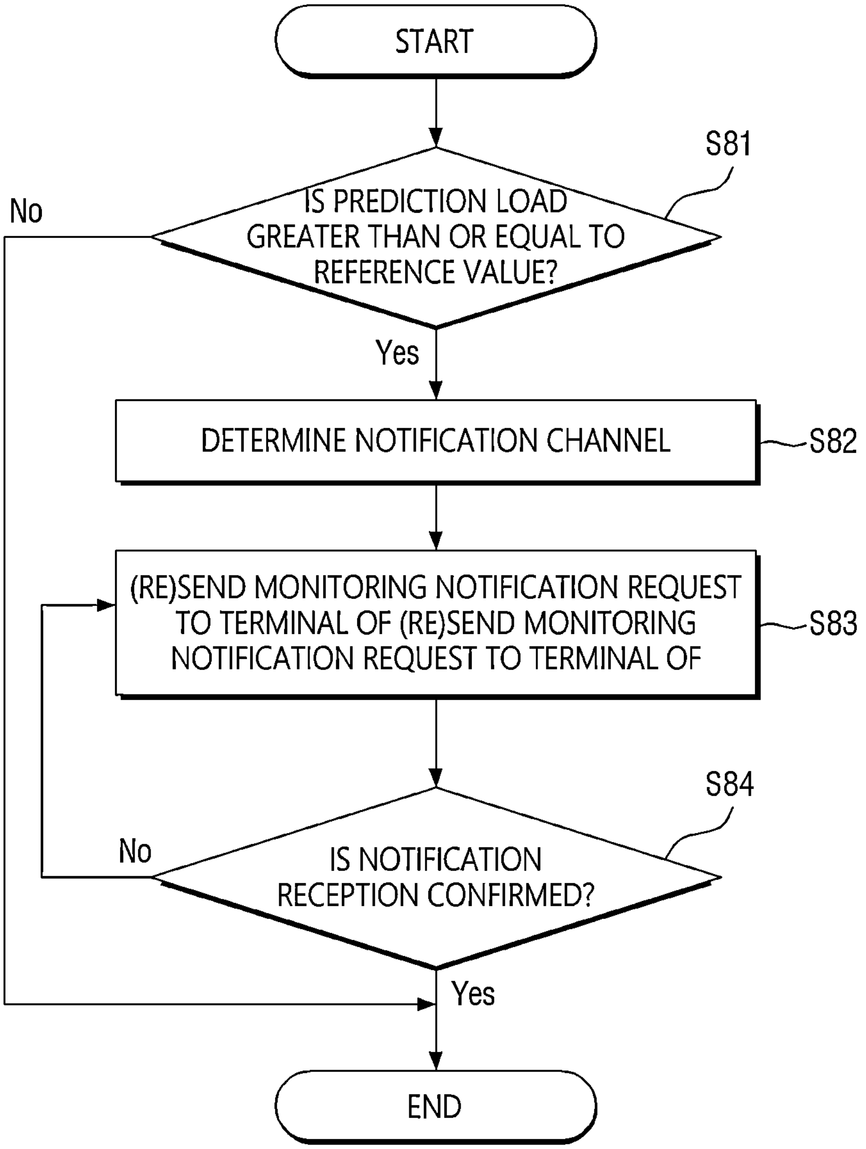
FIG. 8 is an exemplary flowchart illustrating a process of sensing a monitoring request notification according to some exemplary embodiments of the present disclosure.

FIG. 8 is an exemplary flowchart illustrating a process of sensing a monitoring request notification according to some exemplary embodiments of the present disclosure. Each step of the illustrated process may be performed, for example, by the monitoring request module 33 of the message system 10.

As illustrated in FIG. 8, in steps S81 and S82, a notification channel for sending the monitoring request notification may be determined based on the determination that the predicted load is greater than or equal to the second reference value. The notification channel may be, for example, Short Message Service (SMS), email, instant messenger, phone, etc., but the scope of the present disclosure is not limited thereto.

For example, the message system 10 may calculate an urgency score based on a predicted load (or a difference between the predicted load and the second reference value) (e.g., calculated as a proportional value), and determine the notification channel based on the urgency score (e.g., the higher the urgency score, the more likely it is to use a notification channel with high immediacy, such as a phone) . . . . In some cases, the message system 10 may determine the number of notification channels based on the urgency score (e.g., the higher the urgency score, the more notification channels are used).

The second reference value may also be a preset fixed value or a value that changes depending on the situation. For example, the second reference value may also be determined and set in a similar manner to the first reference value. In some cases, the second reference value may be set to a value greater than the first reference value. In this case, automatic control may be performed by the message sending control module 35 in a situation in which the predicted load is slightly high, and manual control may be performed by the administrator in a situation in which the predicted load is very high.

In step S83, a monitoring request notification (i.e., notification message) may be sent to the terminal of the administrator through the determined notification channel.

The monitoring request notification may provide various functions for administrator convenience and immediate action. For example, the monitoring request notification may be configured to provide the administrator with a management interface with a function of controlling the sending speed of the message sending module 36 (e.g., the notification message may include a link of the management interface, or the management interface itself may be embedded in the notification message. Alternatively, the management interface may be automatically displayed on the terminal of the administrator when the notification message is received). As another example, the monitoring request notifications may be configured to provide the administrator with sending schedule information for pre-registered messages (e.g., the notification message may include a ring link of a calendar where the sending schedule is registered or may include the sending schedule information. Alternatively, when the notification message is received, the calendar where the sending schedule is registered may be automatically displayed on the terminal of the administrator). As still another example, the monitoring request notification may also be configured to provide functions according to various combinations of the preceding examples.

The administrator may monitor and control the message sending module 36 through the management interface. For example, the administrator may take actions such as adjusting the sending speed of the message sending module 36, adjusting the sending schedule of the message, canceling the sending schedule of the message, etc. through the management interface.

Meanwhile, in some cases, there may be a plurality of administrators. For example, the administrators may vary depending on time zone or there may be administrators for each department. In this case, the message system 10 may determine an associated administrator (e.g., an administrator of a current time zone, an administrator of a department associated with the target message, etc.) among the plurality of administrators, and may send the monitoring request notification to a terminal of the associated administrator.

In step S84, it may be confirmed whether the administrator has received the monitoring request notification. If the reception is not confirmed for a preset time, the message system 10 may resend a monitoring request notification to the terminal of the administrator (S83). In this case, the message system 10 may also resend the monitoring request notification via another notification channel (e.g., a channel with greater immediacy) and may resend the monitoring request notification using more notification channels.

The time related to the resending may be a preset fixed value or a value that changes depending on a situation. For example, the time may be increased or decreased based on the current load of the message sending module 36 (e.g., the higher the current load, the smaller the time is determined).

Hereinabove, the overall flow of the method for controlling message sending and the process of sending the monitoring request notification according to some exemplary embodiments of the present disclosure have been described with reference to FIGS. 5 to 8. According to the above, the future load of the message sending module 36 (e.g., the load at the scheduled sending time of the target message) may be predicted through the machine-learning model. In addition, the sending speed of the message sending module 36, etc. may be controlled in advance based on the predicted load. Accordingly, the failure occurrence of the message sending module 36 (or message system 10) may be effectively prevented.

In addition, the monitoring request notification may be sent to the terminal of the administrator based on the predicted load. That is, the monitoring request notification may be sent to the terminal of the administrator before a serious load (or issue/failure) occurs. In this case, since the administrator may be given sufficient time to resolve the issue (or take preemptive measures), the failure occurrence of the message sending module 36 (or message system 10) may be more effectively prevented.

In addition, as the monitoring request notification is configured to provide the administrator with the management interface of the message sending module 36, convenience for administrator may be improved and it may be possible to immediately respond to the load (or issues/failure) occurrence.

Hereinafter, a process of training a machine-learning model according to some exemplary embodiments of the present disclosure will be described with reference to FIGS. 9 and 10.

Figure 9:
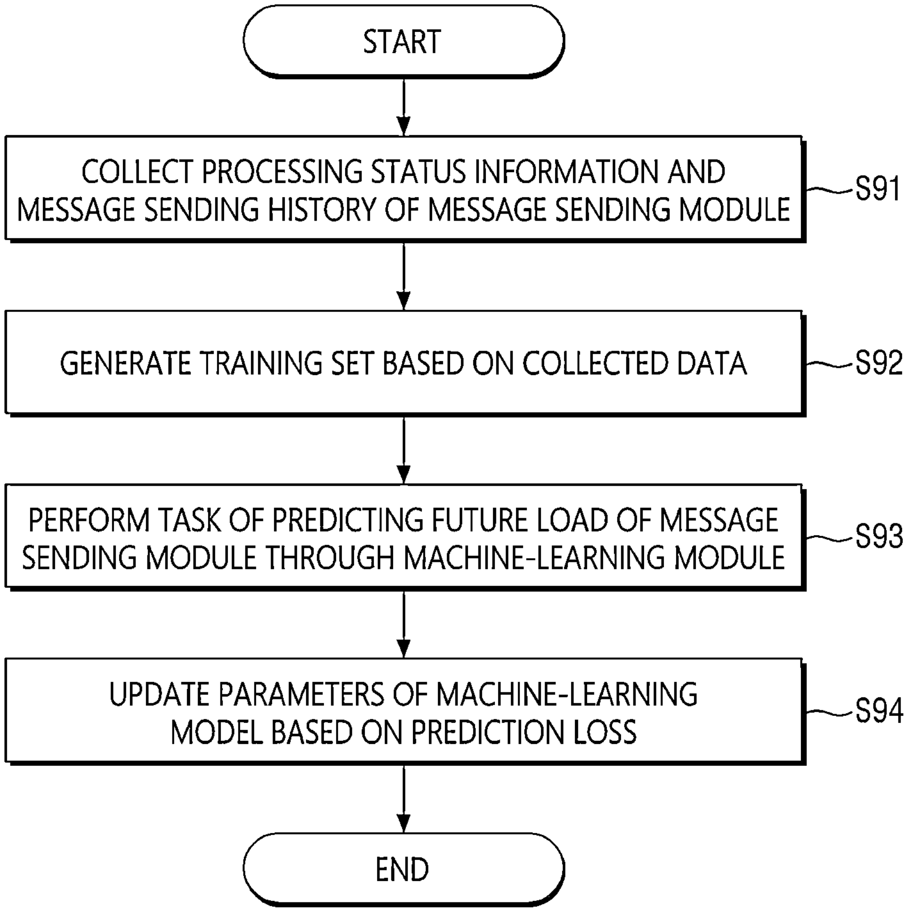
FIGS. 9 and 10 are exemplary diagrams for describing a machine-learning model and a process of training the same according to some exemplary embodiments of the present disclosure.

FIG. 9 is an exemplary flowchart illustrating a process of training a machine-learning model according to some exemplary embodiments of the present disclosure. However, this is only a preferred exemplary embodiment for achieving the object of the present disclosure, and some steps may also be added or deleted as needed. Each step of the process illustrated in FIG. 9 may be performed, for example, by the model management module 34 of the message system 10.

As illustrated in FIG. 9, the process of training the machine-learning model 20 may begin at step S91 of collecting processing status information and message sending history of the message sending module 36. As described above, the processing status information may include the load information, etc., and the message sending history may include, for example, the above-described message sending information. However, the scope of the present disclosure is not limited thereto.

In step S92, a training set may be generated based on the collected information. For example, the message system 10 may generate the training set by configuring the input data as illustrated in Table 2 based on the message sending history and processing status information (e.g., a load at a specific time, cumulative sending amount, remaining sending amount, etc.), and setting the load information of the message sending module 36 (e.g., load at a scheduled sending time of the specific message, load increase amount, etc.) as a label. In this case, the message system 10 may preprocess (e.g., normalize, vectorize, etc.) the input data according to an input form of the machine-learning model 20.

Each sample (i.e., unit data for learning) of the training set may be composed of input data and label information (i.e., correct answer load information). In addition, the input data of each sample may include, for example, processing status information (e.g., load at the specific time, cumulative sending amount, remaining sending amount, etc.) of the message sending module 36 at the specific time and sending information of a specific message (e.g., scheduled sending time, message size, etc.), and label information of each sample may be load information at the scheduled sending time of the specific message. However, the scope of the present disclosure is not limited thereto.

Steps S93 and S94, which will be described later, may be understood as being repeatedly performed for each sample constituting the training set.

In step S93, a task of predicting a future load of the message sending module 36 through the machine-learning model 20 may be performed. That is, the message system 10 may predict and output the future load (e.g., the load at the scheduled sending time of the specific message or the load increase amount, etc.) of the message sending module 36 by inputting the input data of the samples constituting the training set into the machine-learning model 20. For example, the message system 10 may predict the load at the scheduled sending time of the specific message by inputting the input data as illustrated in Table 2 into the machine-learning model 20.

In step S94, parameters of the machine-learning model may be updated based on a prediction loss (i.e., a difference between the predicted load information and the correct answer load information set as a label). For example, the message system 10 may calculate the prediction loss based on the difference between the predicted load information (e.g., load, load increase amount) at the scheduled sending time of the specific message and the correct answer load information (e.g., load, load increase amount) at the corresponding time. Any method may be used to calculate the prediction loss. In addition, the message system 10 may update the parameters of the machine-learning model 20 in a direction that reduces the prediction loss. As these processes are repeatedly performed on various samples of the training set, the machine-learning model 20 has accurate load prediction capabilities.

The machine-learning model 20 may be implemented based on any model with learnable parameters. For example, the machine-learning model 20 may be implemented based on a neural network (e.g., artificial neural network, transformer, etc.), or may also be implemented based on a traditional machine-learning model.

Figure 10:
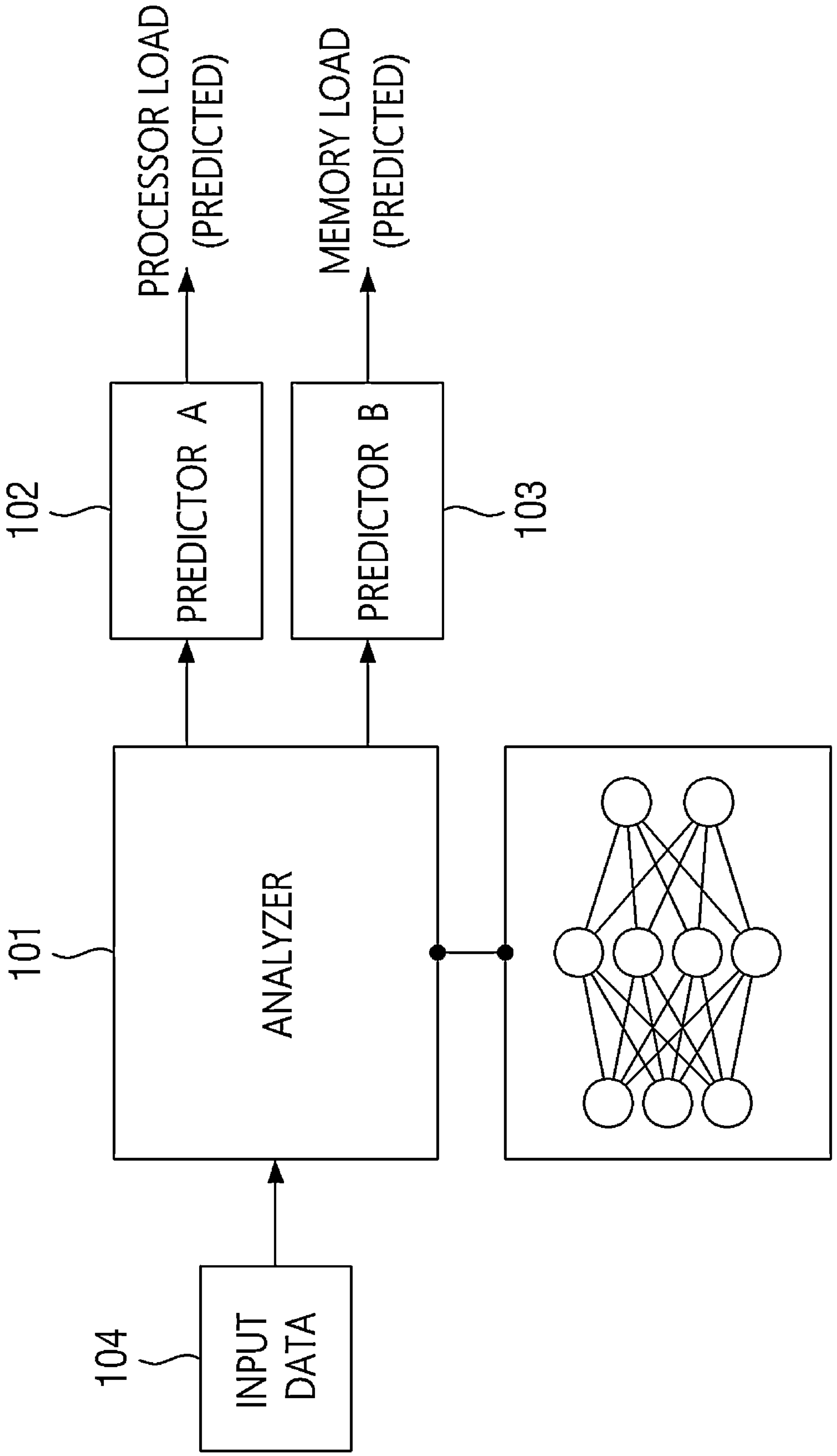

FIG. 10 illustrates an example of the machine-learning model 20.

As illustrated in FIG. 10, the machine-learning model 20 may include an analyzer 101 and at least one predictor 102 and 103. FIG. 10 illustrates a case in which the machine-learning model 20 includes a plurality of predictors 102 and 103.

The analyzer 101 is a module that analyzes the input data 104 described above. The analyzer 101 may be implemented based on a neural network, but the scope of the present disclosure is not limited thereto.

Next, the predictor (e.g., 102) is a module that predicts load information based on analysis results. The predictor (e.g., 102) may be implemented based on, for example, a fully connected layer, but the scope of the present disclosure is not limited thereto.

As illustrated, the machine-learning model 20 may also be configured to include a plurality of predictors 102 and 103. In this case, a first predictor (e.g., 102, "A") and a second predictor (e.g., 103, "B") may predict, for example, whether the load increases (e.g., whether the load increases at the scheduled sending time of the specific message), the future load (e.g., the load or the load increase amount at the scheduled sending time of the specific message), load information (e.g., whether a load increases, a future load, a future load increase amount, etc.) of specific resources (e.g., processor, memory). However, the first predictor (e.g., 102) and the second predictor (e.g., 103) may be configured to predict different targets (i.e., the tasks are different). In this way, the machine-learning model 20 may be trained through various tasks, and as a result, the performance of the machine-learning model 20 may be improved. FIG. 10 illustrates a case in which two predictors 102 and 103 are configured to predict future loads of the processor and memory, respectively.

Hereinabove, the process of training the machine-learning model according to some exemplary embodiments of the present disclosure has been described with reference to FIGS. 9 and 10. Hereinafter, in order to further provide convenience of understanding, an operation scenario of the above-described message system 10 will be described with reference to FIGS. 11 and 12.

Figure 11:
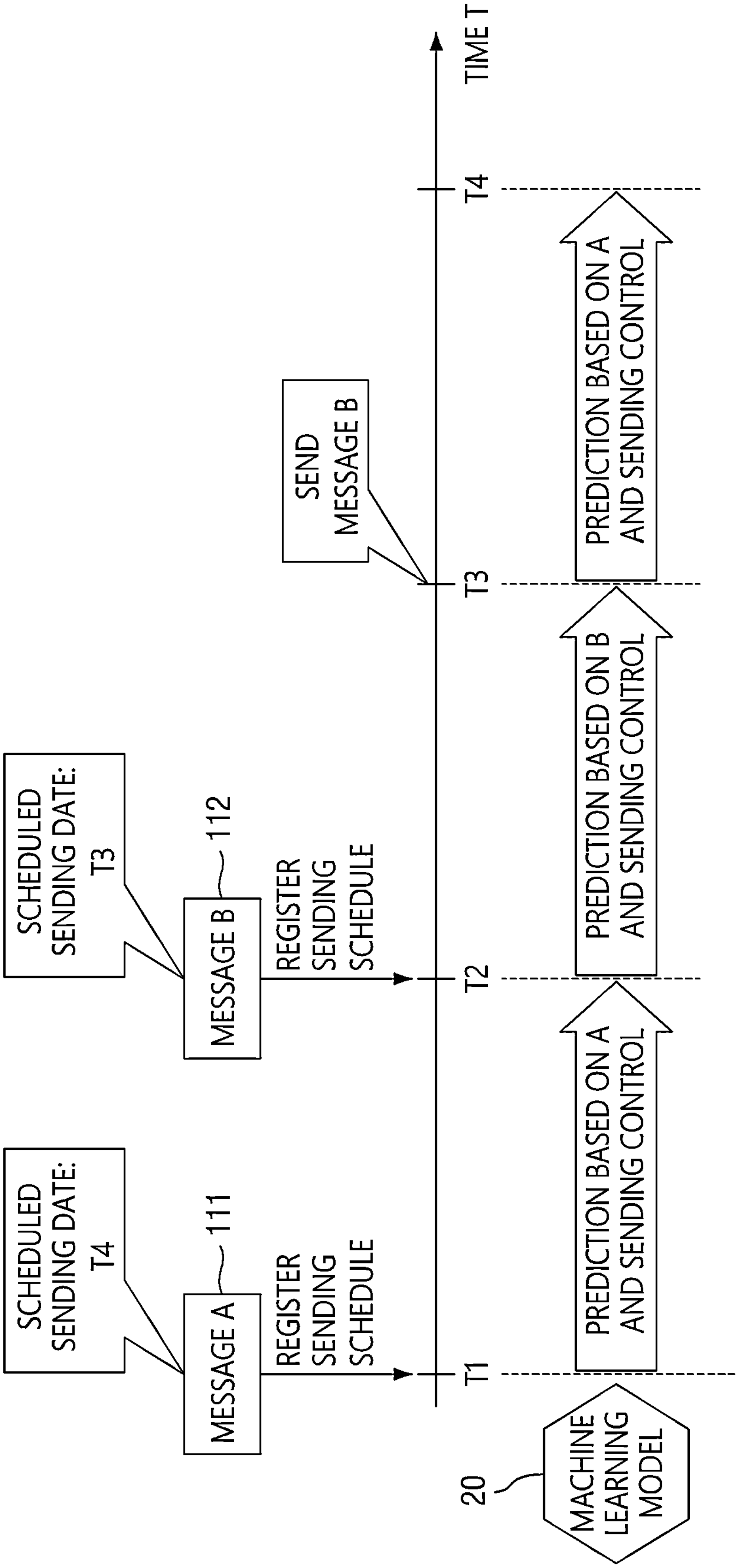
FIG. 11 is an exemplary diagram for describing an operation scenario of the message service system according to some exemplary embodiments of the present disclosure.

FIG. 11 is an exemplary diagram for describing an operation scenario of the message service system 10 according to some exemplary embodiments of the present disclosure. In the following description, for clarity of the present disclosure, the message 111 or 121 ("A") will be referred to as "first message" and the message 112 or 122 ("B") will be referred to as "second message".

As illustrated in FIG. 11, when a sending schedule of a first message 111 is registered, the message system 10 may predict a load of the message sending module 36 at a scheduled sending time (e.g., T4) of the first message 111 through the machine-learning model 20 and may control the message sending module 36 based on the predicted load.

Thereafter, when a sending schedule of a second message 112 is registered, the message system 10 may determine whether a scheduled sending time (e.g., T3) of the second message 112 is earlier than that of the first message 111. In addition, the message system 10 may re-predict the load of the message sending module 36 through the machine-learning model 20 based on the determination that the scheduled sending time of the second message 112 is earlier than that of the first message 111. That is, the message system 10 may predict a load at the scheduled sending time of the second message 112 through the machine-learning model 20 and control the message sending module 36 based on the predicted load.

When the sending of the second message 112 is completed, the message system 10 may re-predict the load at the scheduled sending time (e.g., T4) of the first message 111 through the machine-learning model 20 and control the message sending module 36 based on the re-predicted load.

Figure 12:
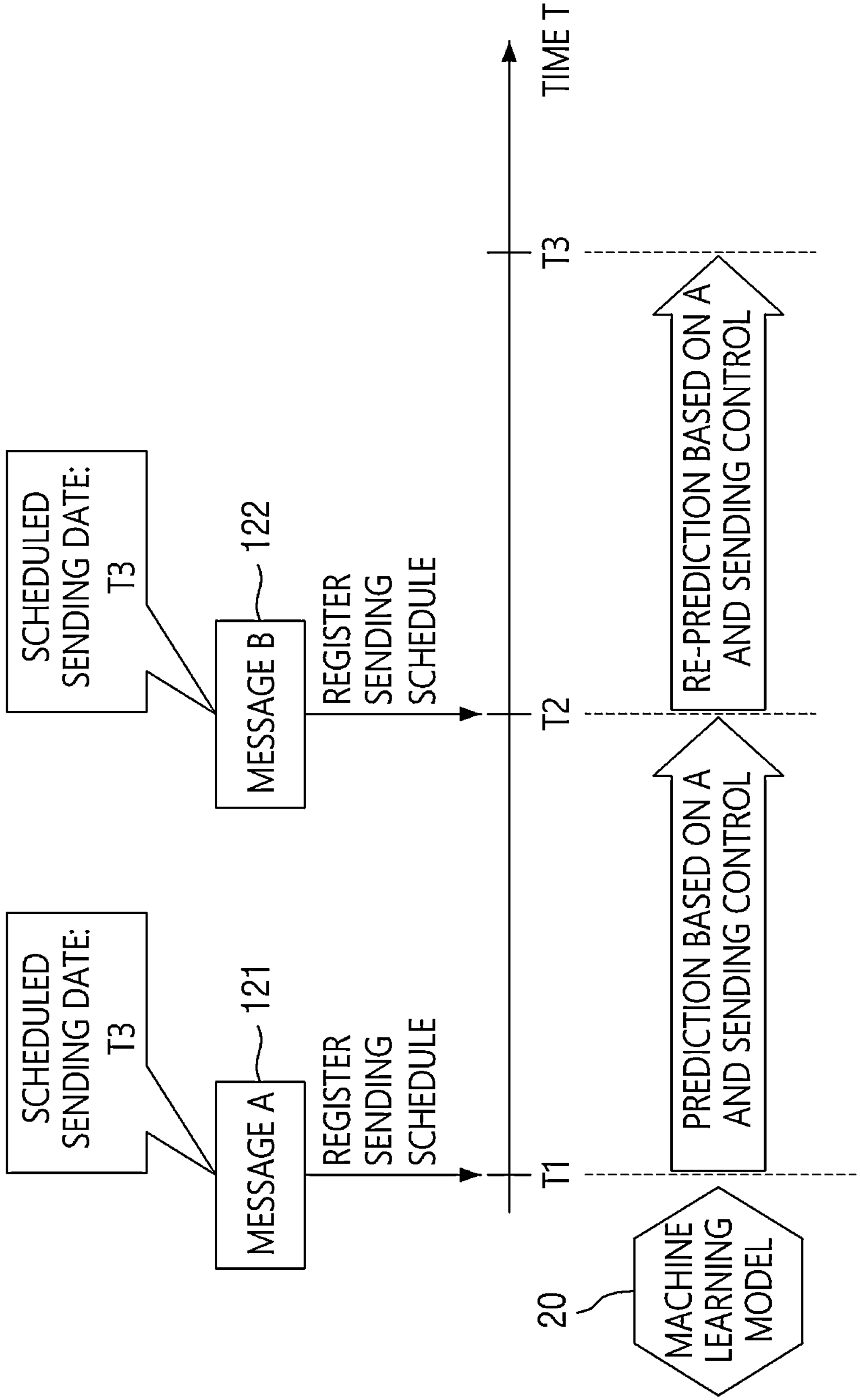
FIG. 12 is an exemplary diagram for describing another operation scenario of the message service system according to some exemplary embodiments of the present disclosure.

FIG. 12 is an exemplary diagram for describing another operation scenario of the message service system 10 according to some exemplary embodiments of the present disclosure.

As illustrated in FIG. 12, when a sending schedule of a first message 121 is registered, the message system 10 may predict a load of the message sending module 36 at a scheduled sending time (e.g., T3) of the first message 121 through the machine-learning model 20 and may control the message sending module 36 based on the predicted load.

Thereafter, assume that a sending schedule of a second message 122 among the pre-registered messages is canceled. In addition, assume that the scheduled sending time of the second message 122 is earlier than or equal to that of the first message 121. In this case, since there has been a change in the processing status of the message sending module 36 (e.g., the remaining sending amount changes), the message system 10 can re-predict the load at the scheduled sending time of the first message 121 through the machine-learning model 20 (that is, the input data is re-configured by reflecting the changed processing status information and the prediction is performed using the pre-configured input data). In addition, the message system 10 may control the message sending module 36 based on the corresponding load. In this way, the message sending module 36 may be more accurately and effectively controlled (e.g., unnecessary adjustment of the sending speed may be prevented).

Hereinabove, the operation scenarios of the message system 10 according to some exemplary embodiments of the present disclosure have been described with reference to FIGS. 11 and 12. Hereinafter, an exemplary computing device 130 capable of implementing the message system 10 according to some exemplary embodiments of the present disclosure will be described with reference to FIG. 13.

Figure 13:
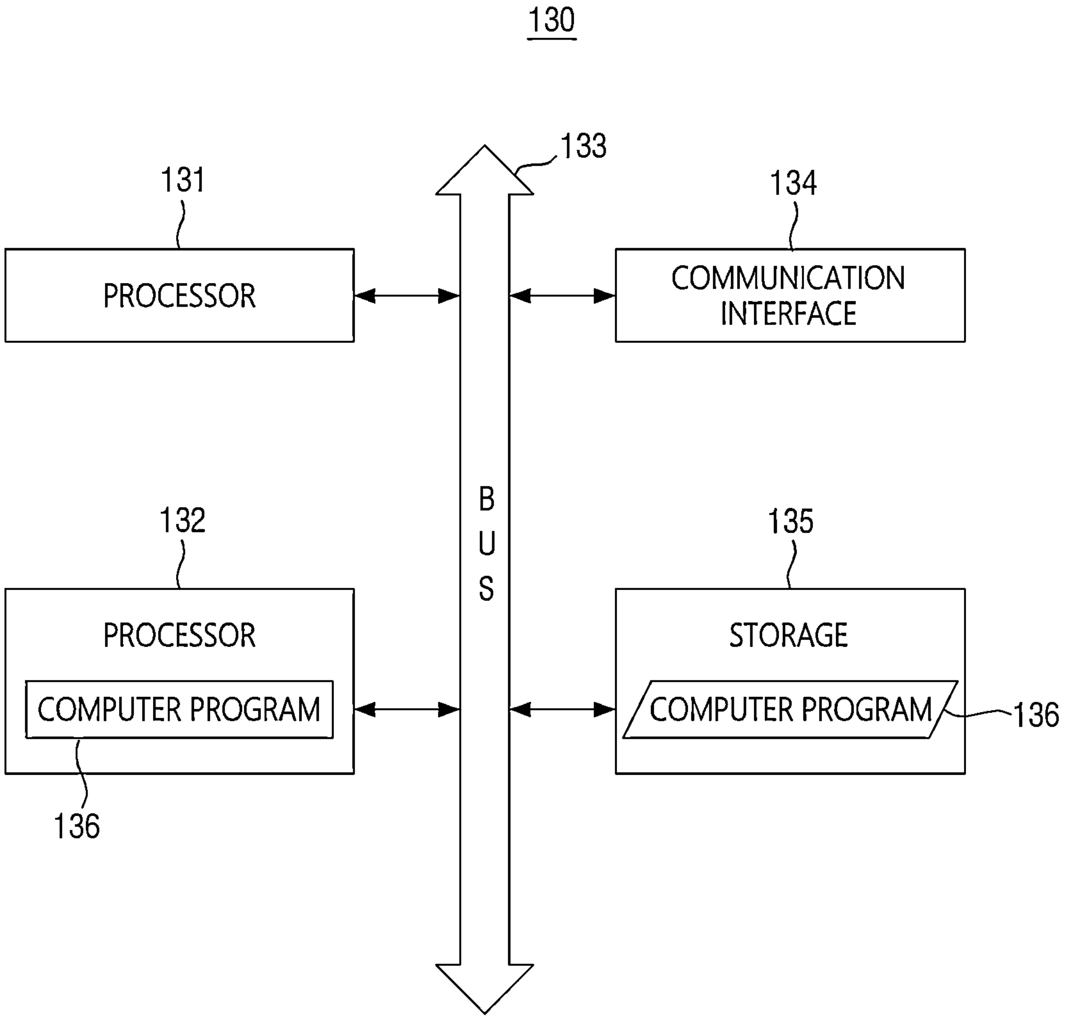
FIG. 13 illustrates an exemplary computing device capable of implementing the message service system according to some exemplary embodiments of the present disclosure.

FIG. 13 is an exemplary hardware configuration diagram illustrating the computing device 130.

As illustrated in FIG. 13, the computing device 130 may include one or more processors 131, a bus 133, a communication interface 134, a memory 132 for loading a computer program executed by the processor 131, and a storage 135 for storing the computer program 136. However, only the components related to the exemplary embodiments of the present disclosure are illustrated in FIG. 13. Accordingly, those skilled in the art to which the present disclosure pertains may see that other general-purpose components other than the components illustrated in FIG. 13 may be further included. That is, the computing device 130 may further include various components other than the components illustrated in FIG. 13. In addition, in some cases, the computing device 130 may also be configured in a form in which some of the components illustrated in FIG. 13 are omitted. Hereinafter, each component of the computing device 130 will be described.

The processor 131 may control an overall operation of each component of the computing device 130. The processor 131 may be configured to include at least one of a central processing unit (CPU), a micro processor unit (MPU), a micro controller unit (MCU), a graphic processing unit (GPU), or any type of processor well known in the art. In addition, the processor 131 may perform a calculation on at least one application or program for executing the operations/methods according to the exemplary embodiments of the present disclosure. The computing device 130 may include one or more processors.

Next, the memory 132 stores various data, commands, and/or information. The memory 132 may load the computer program 136 from the storage 135 to execute the operations/methods according to the exemplary embodiments of the present disclosure. The memory 132 may be implemented as a volatile memory such as RAM, but the technical scope of the present disclosure is not limited thereto.

Next, the bus 133 may provide a communications function between the components of the computing device 130. The bus 133 may be implemented as various types of buses, such as an address bus, a data bus, and a control bus.

Next, the communication interface 134 supports wired/wireless Internet communications of the computing device 130. In addition, the communication interface 134 may also support various communication methods other than Internet communications. To this end, the communication interface 134 may include a communication module well known in the art of the present disclosure.

Next, the storage 135 may non-temporarily store one or more computer programs 136. The storage 135 may include a non-volatile memory such as a read only memory (ROM), an erasable programmable ROM (EPROM), an electrically erasable programmable ROM (EEPROM), a flash memory, or the like, a hard disk, a removable disk, or any form of computer-readable recording medium well known in the art to which the present disclosure pertains.

Next, the computer program 136 may include one or more instructions that when loaded into memory 132, cause the processor 131 to perform the operations/methods according to various exemplary embodiments of the present disclosure. That is, the processor 131 may perform the operations/methods according to various exemplary embodiments of the present disclosure by executing the one or more instructions.

For example, the computer program 136 may include instructions for performing an operation of acquiring sending information of a target message, an operation of configuring input data of a machine-learning model 20 based on the sending information, an operation of predicting a load of a message sending module 36 according to sending the target message from the input data through the machine-learning model 20, and an operation of controlling the message sending module 36 based on the predicted load.

As another example, the computer program 136 may include instructions that perform at least some of the steps/operations described with reference to FIGS. 1 to 12.

In the case as illustrated, the message system 10 and/or the components 31 to 36 thereof according to some exemplary embodiments of the present disclosure may be implemented through the computing device 130.

Meanwhile, in some exemplary embodiments, the computing device 130 illustrated in FIG. 13 may also refer to a virtual machine implemented based on cloud technology. For example, the computing device 130 may be a virtual machine operating on one or more physical servers included in a server farm. In this case, at least some of the processor 131, the memory 132, and the storage 135 illustrated in FIG. 13 may be virtual hardware, and the communication interface 134 may be implemented as a virtualized networking element such as a virtual switch.

Hereinabove, the exemplary computing device 130 capable of implementing the message system 10 according to some exemplary embodiments of the present disclosure has been described with reference to FIG. 13.

So far, a variety of embodiments of the present disclosure and the effects according to embodiments thereof have been mentioned with reference to FIGS. 1 to 13. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A processor-implemented method for controlling message sending, performed by at least one computing device, the method comprising:

acquiring sending information of a target message, the sending information includes at least information about a sending schedule of the target message;

configuring input data of a machine-learning model based on the sending information, the machine-learning model being trained to predict a future load of a message sending module;

predicting the future load of the message sending module based on the input data using the machine-learning model; and controlling the message sending module based on the predicted future load, wherein the predicting the future load of the message sending module includes predicting a load at a scheduled sending time of the target message, and wherein the method further comprising training the machine-learning model using training data including:

inputting the training data, including a scheduled sending time of a specific message, a load of the message sending module at a specific time, a remaining sending amount at the specific time, and a sending speed at the specific time, into the machine-learning model;

acquiring future load information output from the machine-learning model, the future load information relating to load information at the scheduled sending time of the specific message; and updating parameters of the machine-learning model based on a difference between the acquired future load information and correct answer load information of the training data.

2. The method of claim 1, wherein the configuring of the input data of the machine-learning model includes configuring the input data by reflecting the sending information in processing status information of the message sending module.

3. The method of claim 2, wherein the processing status information includes a cumulative sending amount to date, a remaining sending amount, and a current sending speed.

4. The method of claim 1, wherein the predicting of the future load of the message sending module includes predicting the future load of the message sending module in response to the sending schedule of the target message being registered.

5. The method of claim 1, wherein the input data includes information regarding the scheduled sending time of the target message, and the predicting of the future load of the message sending module includes predicting the future load of the message sending module at the scheduled sending time.

6. The method of claim 5, wherein the controlling of the message sending module includes:

determining a maximum adjustment range for a sending speed of the message sending module based on the predicted future load; and gradually increasing or decreasing the sending speed of the message sending module so that the sending speed of the message sending module is adjusted to the maximum adjustment range at the scheduled sending time.

7. The method of claim 1, wherein the controlling of the message sending module includes decreasing a sending speed of the message sending module based on a determination that the predicted future load is greater than or equal to a reference value.

8. The method of claim 1, wherein the sending information further includes information about a message length of the target message, and a recipient count, and the controlling of the message sending module includes adjusting the sending schedule of the target message based on a determination that the predicted future load is greater than or equal to a reference value.

9. The method of claim 1, further comprising sending a monitoring request notification to a terminal of an administrator of the message sending module based on the determination that the predicted future load is greater than or equal to a reference value, wherein the monitoring request notification is configured to provide the administrator with a management interface having a sending speed control function of the message sending module.

10. The method of claim 1, further comprising sending a monitoring request notification to a terminal of an administrator of the message sending module based on the determination that the predicted future load is greater than or equal to a reference value, wherein the monitoring request notification is configured to provide the administrator with sending schedule information for pre-registered messages.

11. The method of claim 1, further comprising:

acquiring a new machine-learning model; and controlling sending of a message different from the target message using the new machine-learning model, wherein the new machine-learning model is trained using processing status information including load information of the message sending module and message sending history collected after training of the machine-learning model is completed.

12. A message service system comprising:

one or more processors; and a memory that stores a computer program executed by the one or more processors, wherein the computer program includes instructions that perform operations of:

acquiring sending information for a target message, the sending information includes at least information about a sending schedule of the target message;

configuring input data of a machine-learning model based on the sending information, the machine-learning model being trained to predict a future load of a message sending module;

predicting the future load of the message sending module based on the input data using the machine-learning model; and controlling the message sending module based on the predicted future load, wherein the predicting the future load of the message sending module includes predicting a load at a scheduled sending time of the target message, and wherein the computer program includes instructions that perform operations of training the machine-learning model using training data including:

inputting the training data, including a scheduled sending time of a specific message, a load of the message sending module at a specific time, a remaining sending amount at the specific time, and a sending speed at the specific time, into the machine-learning model;

acquiring future load information output from the machine-learning model, the future load information relating to load information at the scheduled sending time of the specific message; and updating parameters of the machine-learning model based on a difference between the acquired future load information and correct answer load information of the training data.

13. The message service system of claim 12, wherein the operation of configuring the input data of the machine-learning model includes an operation of configuring the input data by reflecting the sending information in processing status information of the message sending module.

14. The message service system of claim 12, wherein the operation of predicting the load of the message sending module according to the sending of the target includes an operation of predicting the load of the message sending module in response to a sending schedule of the target message being registered.

15. The message service system of claim 12, wherein the input data includes information regarding the scheduled sending time of the target message, and the operation of predicting the load of the message sending module according to the sending of the target includes an operation of predicting the load of the message sending module at the scheduled sending time.

16. The message service system of claim 12, wherein the computer program further includes an instruction that performs an operation of sending a monitoring request notification to a terminal of an administrator of the message sending module based on the determination that the predicted load is greater than or equal to a reference value, the monitoring request notification is configured to provide the administrator with a management interface having a sending speed control function of the message sending module.

17. The message service system of claim 12, wherein the computer program further includes an instruction that performs an operation of sending a monitoring request notification to a terminal of an administrator of the message sending module based on the determination that the predicted load is greater than or equal to a reference value, the monitoring request notification is configured to provide the administrator with sending schedule information for pre-registered messages.

18. The message service system of claim 12, wherein the computer program further includes instructions that perform:

an operation of acquiring a new machine-learning model; and an operation of controlling sending of a message different from the target message using the new machine-learning model, and the new machine-learning model is trained using processing status information including load information of the message sending module and message sending history collected after training of the machine-learning model is completed.

19. A non-transitory computer-readable storage medium storing computer program with instructions that, when executed by a processor of a computing device-, configure the processor to:

acquire sending information for a target message, the sending information includes at least information about a sending schedule of the target message;

configure input data of a machine-learning model based on the sending information, the machine-learning model being trained to predict a future load of a message sending module;

predict the future load of the message sending module based on the input data using the machine-learning model; and control the message sending module based on the predicted future load, wherein the predicting the future load of the message sending module includes predicting a load at a scheduled sending time of the target message, and wherein the processor is further configured to train the machine-learning model using training data including:

inputting the training data, including a scheduled sending time of a specific message, a load of the message sending module at a specific time, a remaining sending amount at the specific time, and a sending speed at the specific time, into the machine-learning model;

acquiring future load information output from the machine-learning model, the future load information relating to load information at the scheduled sending time of the specific message; and updating parameters of the machine-learning model based on a difference between the acquired future load information and correct answer load information of the training data.

* * * * *